United States Patent [19]

Olsen

[11] Patent Number: 5,277,386
[45] Date of Patent: Jan. 11, 1994

[54] HOSE AND CABLE CONVEYOR

[75] Inventor: Svein E. Olsen, Kristiansand, Norway

[73] Assignee: Merlin Teknologi AS, Norway

[21] Appl. No.: 855,049

[22] PCT Filed: Oct. 31, 1990

[86] PCT No.: PCT/NO90/00163

§ 371 Date: Jun. 16, 1992

§ 102(e) Date: Jun. 16, 1992

[87] PCT Pub. No.: WO91/07616

PCT Pub. Date: May 30, 1991

[30] Foreign Application Priority Data

Nov. 9, 1989 [NO] Norway ................. 894463

[51] Int. Cl.$^5$ ................................. F16L 3/00
[52] U.S. Cl. ................. 248/51; 137/355.17; 248/49
[58] Field of Search ............ 248/49, 51; 137/355.16–355.17; 59/78.1

[56] References Cited

U.S. PATENT DOCUMENTS

| 2,864,907 | 12/1958 | Waninger ............ 248/49 X |
| 3,020,362 | 2/1962 | Waninger . |
| 3,248,487 | 4/1966 | Dechantsreiter ........ 137/355.17 X |
| 3,752,180 | 8/1973 | Elder ................. 137/355.17 |
| 3,955,593 | 5/1976 | Umphrey ............ 137/355.16 X |
| 3,957,076 | 5/1976 | Jamison ............ 137/355.17 X |
| 3,961,772 | 6/1976 | Sweeney ............ 137/355.16 X |
| 4,093,047 | 6/1978 | Wampfler ............ 248/51 X |
| 4,311,293 | 1/1982 | Tenniswood ........... 248/49 |
| 4,462,565 | 7/1984 | Johnson ............... 248/51 |
| 4,590,961 | 5/1986 | Schumann . |
| 4,625,936 | 12/1986 | Hadden ............... 248/51 X |
| 5,016,841 | 5/1991 | Schumann ............. 248/51 |

FOREIGN PATENT DOCUMENTS

| 236832 | 11/1960 | Australia ............. 248/51 |
| 660175 | 3/1963 | Canada ............... 248/51 |
| 22622006 | 3/1978 | Fed. Rep. of Germany . |
| 22622005 | 6/1978 | Fed. Rep. of Germany . |
| 22360227 | 10/1980 | Fed. Rep. of Germany . |
| 13525332 | 1/1987 | Fed. Rep. of Germany . |
| 777242 | 12/1980 | U.S.S.R. ............ 137/355.16 |
| 834987 | 5/1960 | United Kingdom . |

Primary Examiner—J. Franklin Foss
Attorney, Agent, or Firm—Andrus, Sceales, Starke & Sawall

[57] ABSTRACT

A chain-like conveyor device (6) for protecting accommodation and controlled guidance of flexible cables/hoses/lines extending between a stationary unit, e.g. a fixed production platform (1), and a unit, e.g. a derrick (5), displaceable in relation thereto and movable in at least two directions (P1,P2) intersecting each other, wherein the displacement movements take place in parallel planes, e.g. horizontal planes, and wherein the conveyor device (6) mainly comprising interhinged chain link-like conveyor carriage members (6'), has a first stationary end (6") and a second end (6''') coupled (at 7') to the displaceable unit (5), so that the second end (6''') is brought to follow the displacement movements of the displaceable unit (5) in said planes, e.g. horizontal planes. The pivot axes (32') for the interhinged single members (6') extend perpendicular to said planes, e.g. horizontal planes. Moreover, the conveyor device (6) is assigned external guiding and guide means (14–16, 11,11') as well as a tensioning device (22–24,34). The tensioning device comprises an actuating means (22) attaching on the conveyor device (6) for slackness-accommodating tensioning thereof in any one of its various positions.

6 Claims, 4 Drawing Sheets

HOSE AND CABLE CONVEYOR

The present invention relates to an arrangement in chain-like conveyor devices for protecting accommodation and controlled guidance of flexible cables/hoses/lines to be extended between a stationary unit, a fixed production platform, and one relatively thereto displaceable unit, a derrick, displaceable in two directions intersecting each other at right angles, and wherein said displacements take place in one or two parallel horizontal planes, said chain-like conveyor device substantially comprising interhinged chain link-like single members, has a first stationary end, the other end thereof being coupled to the displaceable unit, so that said other end is brought to follow the displacement movements of the displaceable unit in said horizontal planes, and wherein the chain-like conveyor has the form of a carriage train, the chain link-like carriage members thereof having axes extending perpendicular to or substantially perpendicular to said horizontal planes, the conveyor device/carriage train for securing a controlled movement in said planes, is assigned external guiding and guide means.

Such a chain-like conveyor device wherein said cables/hoses/lines are to be suspended in a large number, serves generally the purpose of enabling a protected support of the cables/hoses/lines through arranged, controlled guidance of the same during said movements between various positions.

It goes without saying that such a cable/hose-conveyor may be used advantageously in a number of different fields. Examples of application areas are production platforms for oil and gas, as well as the mining industry.

In the following, the invention will be described with particular regard to its application in association with offshore production platforms for oil and gas. Nevertheless, as it would be appreciated, this is only an example of a possible application of use, the general field of utilization of the invention merely presupposing that cables, hoses or lines from stationary drive aggregates/power generators are to be extended to an "operating head" movable in two mutually intersecting directions, or to a plurality of such heads, at which power take-off(s) is/are arranged.

In a stationary platform structure, wherein the platform is either stationarily installed on the seabed, or moored in such a manner that it can not be moved, the derrick must be displaceable to and fro in the directions mentioned previously, in order to correspond with one after the other of a plurality of bore holes, e.g. positioned in two substantially parallel rows.

In order to move the derrick between a number of desired positions, the platform is equipped with a skid base carrying the derrick and being movable to and fro in a first direction, the X-direction, in the horizontal plane. More particularly, this skid base is displaceably supported on parallel slide rails mounted on the well head module of the platform. The displacement of the skid base is effected by means of hydraulic gripper jaws and pressure cylinders, by means of which it pulls itself forward along said slide rails.

The derrick substructure is displaceably supported in a second direction, the Y-direction, perpendicular to the first-mentioned direction, along slide rails on the top of the skid base, said substructure being capable of pulling itself forward in this second direction in a manner similar to that of the skid base.

During the displacement of the derrick, all systems needed during the operation of the derrick are to be linked up between the platform and the derrick, the reason being that off/on coupling will be extremely time-consuming, involving approximately 150 cables (high voltage and low voltage cables as well as instrumentation cables) and about 25 hoses (high pressure and low pressure hoses).

Dependent on the number of wells and their mutual positioning, it is known to put on the following arrangements:

So-called aerial cables/hoses are frequently used when the number of wells is relatively small and the wells are positioned within a small area. This prior art solution requires good space in the direction of height between the support points at each end of the aerial cable/hose and, additionally, good space around the entire arrangement, because of the risk that the cables/hoses might stick/cling to the adjacent structure.

So-called drag chains are used when the number of wells is relatively large, and also in cases wherein the wells, additionally, are positioned at more than one joint area, as well as where many wells are situated within two or more areas.

Such a drag chain has the form of a chain-like device, into which the hoses and cables are placed and retained, thereby attaining a protected support and an arranged controlled guidance.

Prior art drag chains are fundamentally built up as e.g. a cycle chain, the link axes extending horizontally in the position of use. Therefore, they are only in a position to perform a movement in one direction in the horizontal plane. This involves the use of at least two such drag chains in order to freely follow the movements of the derrick in one plane.

Moreover, prior art drag chains of this kind have a limited cable/hose-accommodating capacity; with a very large number of cables/hoses (about 150 cables and about 25 hoses), two drag chains for each direction have to be arranged, i.e. totally four for one production platform. Further, these known drag chains have a design wherein the dimensioning (height to width proportion) gives rise to problems associated to the separation between instrumentation cables and high voltage cables, so that these types of cables have to be placed in separate drag chains.

In addition to the two above-mentioned solutions, a further solution has emerged, representing a combination of the two first-mentioned, and wherein low voltage cables and low pressure hoses are suspended from a drag chain, high voltage cables and high pressure hoses being arranged as aerial cables/hoses. Such a combination solution necessitates the arrangement of take-offs for cables/hoses along the displacement path of the skid base.

The known solutions discussed in the foregoing, suffer from a number of serious limitations, shortcomings and disadvantages.

A common feature in aerial cables/hoses consists in a limited operational area and small flexibility. It is difficult to control the torsional movements and bending radii of the hoses/cables. During the above-mentioned displacement movements, the hoses/cables are subjected to getting hooked and damaged. A risk for "erroneous installation" exists, errors being committed in the arrangement of hoses and cables already during the assemblage (dynamic and mechanical limitations of the hoses and cables not being taken into account). Also, hoses and cables are subjected to damage when hanging unprotected (e.g. by falling loads). In sagging hoses and cables, the mechanical strains will increase through dynamic loads such as wind forces and icing.

In known drag chains comprising interarticulated chain link-like carriage members having horizontal link axes, an obvious disadvantage is the need for at least one such carriage device/carriage row for each of two intersecting directions (X- and Y-direction) in that plane (the horizontal plane) in which the power take-off ends of the cables/hoses are to be displaced (together with the derrick). Further, in this known conveyor arrangement, intermediate pipe guides and cable channels are needed, between the conveyor carriage device for the X-direction and the conveyor carriage device for the Y-direction. Pipe guides and cable channels between the two drag chains or between the drag chains in pairs in case of four, must be effected as assembly work subsequent to the skid base/derrick being lifted onto the platform; the reason being that the towing arm of the skid base projects beyond the latter. The cables have to be threaded into the drag chains after the installation of the skid base and the derrick, as joining of these components normally is not allowed. Each separate system necessitates the use of an additional hose and two additional hose couplings, increasing the risk of leakage.

Moreover, known drag chains of this kind, necessitate the use of an additional platform element on the skid base for supporting the drag chain (the drag chains) in the Y-direction. Additionally, a need for additional lengths of hose and cable is existent. Threading/replacement of hoses/cables within the drag chains represent difficult working operations. Moreover, the drag chains with assigned equipment have a disproportionately high weight.

Likewise, in known drag chains, the replacement of interhinged links, either separately or in groups, represents a cumbersome and partly difficult operation, in case they should be damaged during operation.

Finally, investment as well as operational costs are very high with prior art drag chains of this kind. The same goes for the auxiliary equipment.

U.S. Pat. No. 3,020,362 discloses an arrangement in chain-like conveyor devices of the kind defined in the introduction section wherein the chain-like conveyor device is displaceable to and fro in two directions intersecting each other at right angles. The device comprises guide means in the form of cooperating bevelled edges on adjacent chain link-like members, and also (in a vertical arrangement according to FIG. 4) a guiding means in the form of an arched rail guiding the chain in a transition zone between a first direction and a second direction extending perpendicularly to the first direction. According to the embodiments shown, the displaceable unit (e.g. a derrick) is displaceable to and fro in one direction only. This prior art device lacks a chain slackness-accommodating tensioner; yet such a tensioner is known per se (DE-A-3-525 332).

The problem to be solved according to the present invention is to be seen in the need for securing a controlled movement of a carriage train in the directions and in the planes in which the displaceable unit, the derrick, moves.

When designing a conveyor carriage device of the kind defined introductorily as well as the auxiliary equipment assigned thereto, one has aimed at eliminating or substantially reducing all or most of the previously mentioned limitations, shortcomings and disadvantages of prior art technique and, thus, provide a construction wherein the investment and operational costs are substantially reduced, and which is characterized by a number of features involving at least most of the following substantial advantages:

One single chain-like conveyor carriage device is to be adapted to accomodate an approximately nonrestricted operational area in the X- and Y-direction. Measures have been taken in order to avoid twisting of the hoses/cables. Constant control of the bending radii of the hoses/cables is ensured. Reliable protection of hoses/cables against wear and tear as well as mechanical loads is provided. Precautions have been taken against dynamic forces acting on the hoses/cables as well as against overload with regard to tension. Pipe guides and cable ducts on the skid base are made superfluous. Simple insertion of hoses/cables into the row of interconnected carriages (the carriage device) is provided. The hose/cable lengths may be reduced to the absolute minimum, simultaneously avoiding additional couplings and additional platform element on the skid base.

Likewise, one has aimed at achieving a simple replacement of the chain link-like carriage members. Further, the design of the conveyor carriage device allows a simplified replacement of damaged cables/hoses which are to be lifted easily out of the carriage members and into the same. Also, the construction enables a simplified assemblage of hoses and cables subsequent to installation.

Further objects and advantages will appear from the following specification.

Through designing a chain-like conveyor carriage device in accordance with the following claim 1, the primary object of the invention is achieved, namely that one such conveyor carriage device for the protected accomodation of said hoses/cables becomes enabled to serve the purpose previously requiring at least two similar devices, namely in order to enable the displacement of one end, the power take-off end, of the hoses/cables in two directions intersecting each other, the other end thereof, the power intake end, remaining stationarily in relation to the drive aggregates/power generators. Such a construction involves a novel technical effect giving rise to substantial savings in investment and operational costs, as compared with the state of the art.

Through designing the conveyor carriage device according to claim 1, conditions are simultaneously arranged for the achievement of a number of the previously mentioned advantages, clearly appearing from the following specification.

Advantageous embodiments representing improved further developments of the invention according to claim 1 and exhibiting subordinate, yet appropriate features suitable for the purpose, are defined in the sub claims.

A chain-like conveyor carriage device of the kind indicated introductorily, does, in accordance with the invention, comprise interhinged carriage members the link axes thereof extending at least approximately perpendicular to the plane wherein the displacement of the first ends (power take-off ends) of the hoses/cables is to take place in two directions intersecting each other; this being contrary to prior art drag chains having a fundamentally corresponding construction and wherein the link axes for the interhinged chain links extend parallel to the plane wherein said displacement is to take place. The chain-like conveyor carriage device according to the invention is assigned external guide means as well as a stretching device, which at all times provides for the taking-up of slackness, thus keeping the "link chain" stretched.

In the above-mentioned purpose of application on board a stationary production platform, the longitudinal extension of the carriage row of the conveyor carriage device is set on the basis of the necessary displacement distance for the skid base and for the derrick, respectively, so that drilling may be performed from any one of a plurality of wells within the platform. A corresponding number of interhinged chain link-like carriage members is adjusted to said extension, and the row of carriages forming the conveyor carriage device may, in correspondence with a ordinary cycle chain, perform the necessary pivotal movements in the horizontal plane directed by said external guide members and allowed by the stretching device, respectively.

The invention is further explained in the following, reference being made to examples of preferred/possible embodiments diagrammatically illustrated in the attached drawings, wherein.

Figure 5:
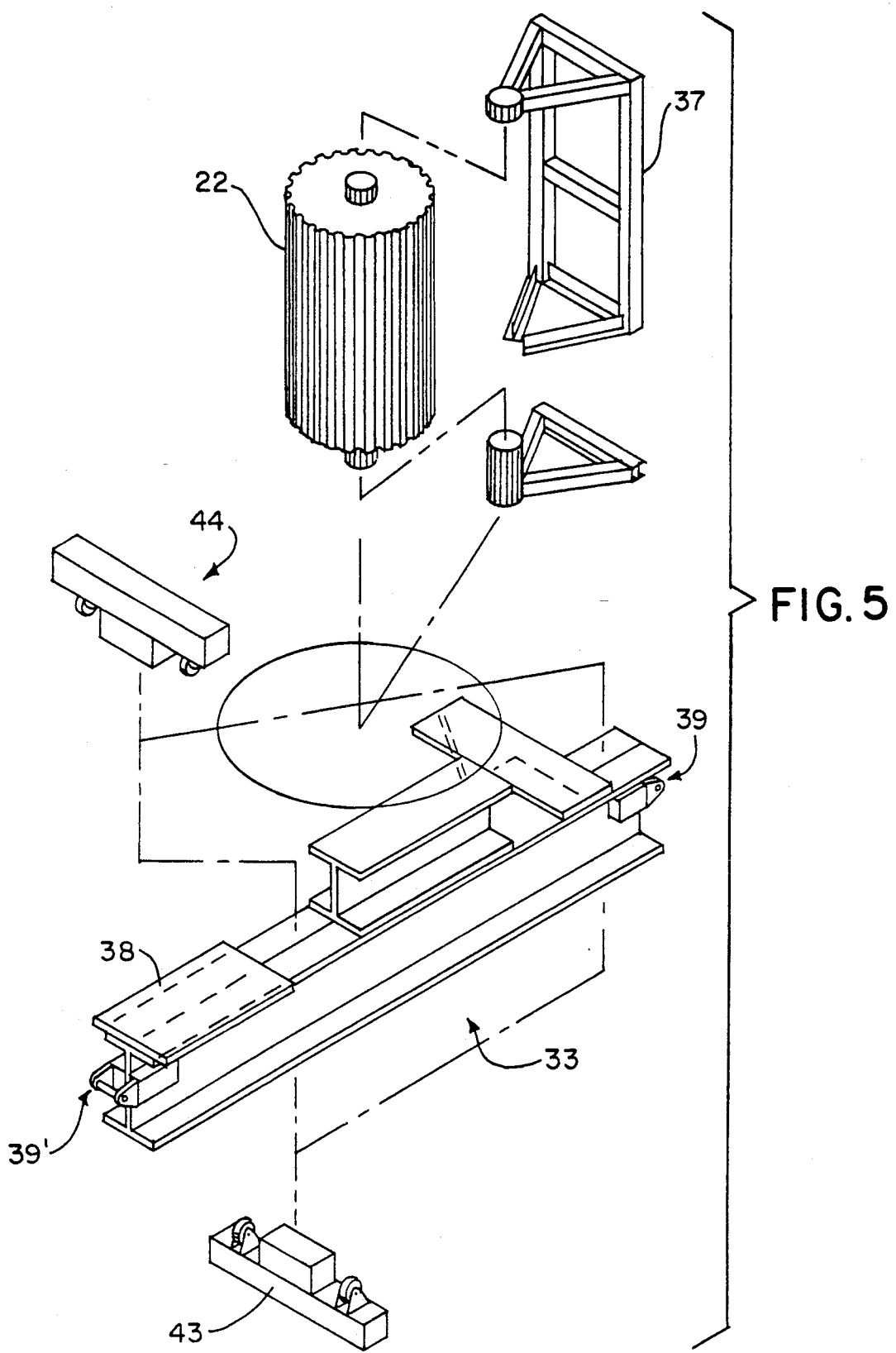
Figure 6:
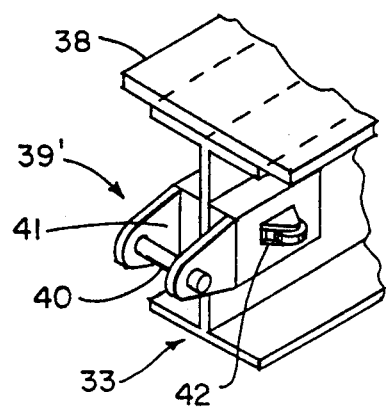
Figure 7:
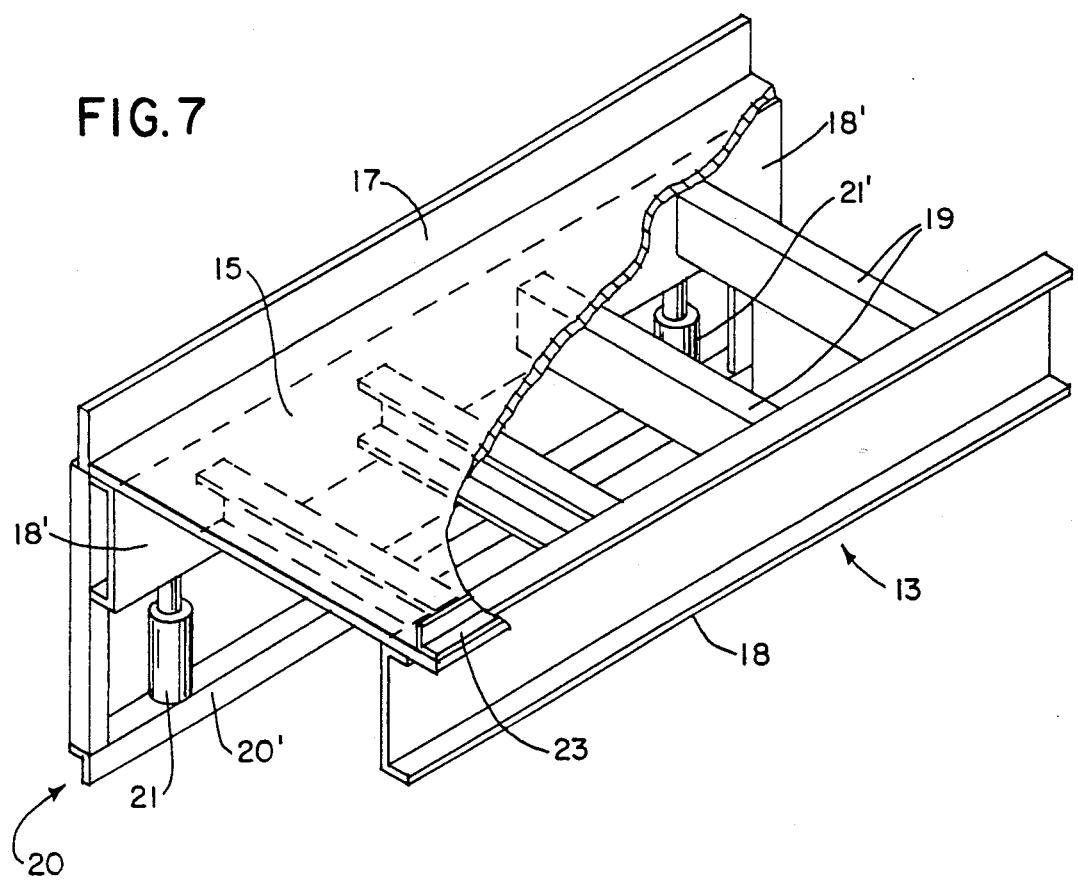

FIG. 5 in perspective exploded view shows details of the stretching device;

FIG. 6 shows a detail of the stretching device of FIG. 5 on a larger scale;

FIG. 7 shows a perspective view of a liftable and lowerable lateral limiting device, which advantageously may be used along at least one lateral edge of the rolling track for the conveyor carriage device.

Figure 1:
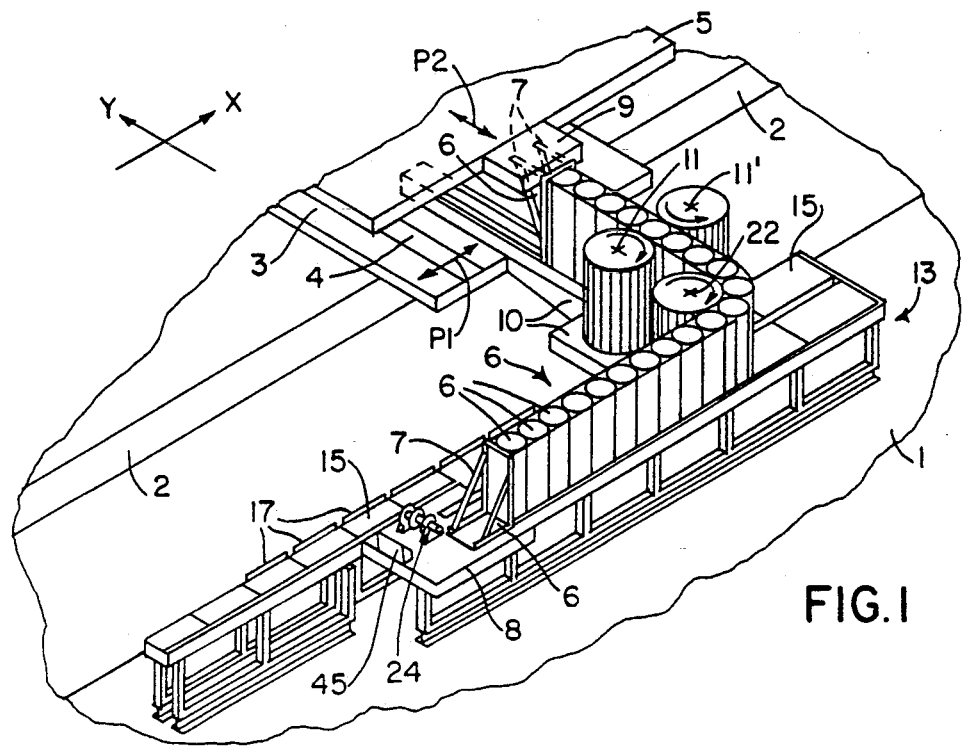
FIG. 1 is a perspective general drawing in fragmentary view showing the chain-like conveyor carriage device for hoses/cables, arranged on a production platform in association with a displaceable derrick on a displaceable skid base.
Figure 2:
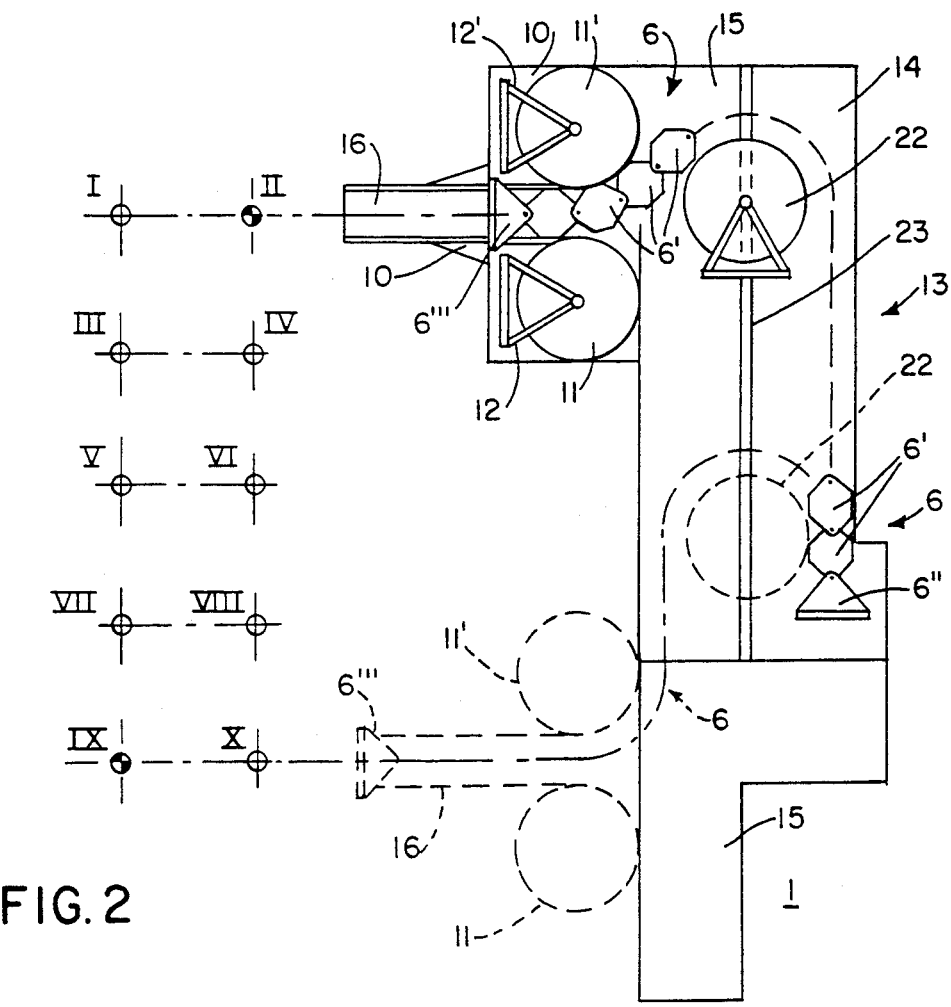
FIG. 2 is a corresponding top plan view, showing the conveyor carriage device together with assigned equipment (guide means, stretching device) in two extreme positions.

Reference is first being made to FIGS. 1 and 2, wherein the reference numeral 1 denotes a stationary platform, which fundamentally could be constituted by a corresponding stationary unit, e.g. an appropriate stationary (horizontal) support in or in the immediate vicinity of a mine.

The platform floor carries two parallel guide rails 2 (only one is visible in FIG. 1, the rails being omitted from FIG. 2) for a skid base 3 displaceable to and fro in accordance with the double arrow P1.

On top, the skid base 3 carries two guide rails 4 (only one is visible in FIG. 1) extending at right angles in relation to the guide rails 2 and serving for the displaceable support of the substructure 5 of the derrick, so that it may be displaced to and fro according to the double arrow P2, simultaneously following the displacement movements of the skid base according to the double arrow P1. In the following text, the reference numeral 5 will also be used in order to denote the derrick as such.

In accordance with FIG. 2, there are ten bore holes I-X situated in two parallel rows. Of course, this is a non-limiting example of bore hole number and positioning. Being displaceable in two directions extending at right angles in relation to each other, the derrick may be brought to correspond with any one of these bore holes. Cables and hoses which, at one end thereof—the power take—off end—are coupled to the derrick 5, will, of course, participate in these displacement movements, the other end thereof—the power intake end—being stationarily positioned on the platform, adjacent the drive aggregates.

For this purpose, said cables/hoses are suspended within a chain-like conveyor carriage device generally denoted at 6.

This chain-like conveyor carriage device comprises a number of interhinged chain link-like carriage members, generally denoted at 6', to be further explained in connection with FIG. 3. The two terminal links, the anchor links, are denoted at 6" (the fixed point) and 6'" (the towing point), respectively, and have a somewhat different design than the remaining chain link-like carriage members 6'. More particularly, the fixed point link 6" is anchored on a stationary holder structure 7 arranged on a base 8 on the platform floor 1, the towing point link 6'" being anchored on a corresponding carrier 7' on a plate 9 formed integrally with the derrick substructure 5.

The skid base 3 is formed with a laterally (in relation to the displacement direction of the skid base 3) projecting T-shaped frame 10 carrying a couple of opposing upright guide means 11,11'. According to the embodiment shown, each guide means has the form of a cylindrical roller freely rotating in both rotational directions. The shortest spacing between the circumferences of these cylindrical rollers 11,11' slightly exceeds the lateral dimension of the chain-like conveyor carriage device 6. Each roller 11,11' is, according to FIG. 2, supported in an appropriate pedestal 12,12'. Fundamentally, this guide device 11,11' may—without departing from the scope of the invention—be replaced by any other suitable guide mechanism.

In FIG. 1, the reference numeral 13 generally denotes an elongated horizontally extending support structure, the top face thereof being formed with guiding tracks 14 and 15 for the conveyor carriage device 6. These tracks 14,15 extend parallel with the displacement directions of the skid base 3 (double arrow P1). Over a portion of the longitudinal extent of the guiding tracks, the guiding tracks 14,15 appear to be double. However, the guiding track 15 has a longer extent than the guiding track 14, so that a single guiding track 15 exists at one terminal portion. This appears clearly from FIG. 1.

These parallel guiding tracks 14,15 are assigned a lateral track forming guiding track 16 on the laterally projecting skid base frame 10 for the guide rollers 11,11'.

The particular courses of the guiding tracks 14–16 are, of course, adapted to the conditions especially prevailing on board a stationary production platform having a derrick 5 displaceable in two at right angles intersecting directions. Thus, said courses are to adapt and adjust to the task to be solved, e.g. in a mine, in connection with construction work, etc.

Along the lateral edge of the guiding track 15 facing the skid base 3, lateral limitation elements 17 have been arranged. In order to allow passage of the frame 10 carrying the guide rollers 11,11' and the intermediate portion of the row of carriages past these lateral limitation elements 17, it is obvious that the latter must be capable of being lowered during said passage for, immediately thereafter, to be raised in order to function according to their purpose, i.e. to counteract derailing of the conveyor carriage device along said lateral edge.

These liftable and lowerable lateral limitation elements 17 are, in detail, illustrated in perspective view in FIG. 7, wherein one single lateral limitation element is shown in the form of a vertically displaceable gate 17. However, as appearing from FIG. 1, there are a number of such gates 17, positioned side by side, in the continuation of each other along the external lateral edge of the guiding track According to FIG. 7, the reference numerals 18 and 18' denote two longitudinal laying U-frame beams having opposing web backs and being incorporated into the support structure 13, 19 indicating lateral connecting beams of the frame structure. A carrier and guiding frame 20 for each gate 17 is attached to the outermost U-frame beam 18'. To the lower longitudinal frame portion 20' of this carrier and guiding frame 20 is mounted two pressure fluid cylinders 21 and 21', the piston rod ends thereof (hidden in FIG. 7) attaching at the bottom edge of the gate 17.

In the position shown in FIG. 7, the lateral limitation gate 17 projects clearly above the level of the guiding track 15, thereby serving its intended task, namely to counteract derailing of the row of conveyor carriages 6. However, when activating the pressure cylinders 21,21', the gate 17 may be lowered to a level wherein it now longer prevents the free passage of the lateral portion of said row of carriages 6, namely that portion extending in between the guide rollers 11,11'.

In order to make the shown cable/hose-carrying chain-like conveyor carriage device 6 act appropriately in accordance with its intended task, it must, additionally to the shown and described guide/guiding devices 14–16 and 11,11', be assigned a suitable stretching device adapted to take up slackness, thus keeping the "link chain" tensioned at all times.

For this purpose, there is arranged a slackness-accommodating stretching or tensioning device which, according to FIGS. 1 and 2, is indicated through the tensioning roller 22 attacking directly on the "link chain" 6, and a guiding track 23 for the tensioning roller 22 extending intermediate and parallel to the guiding tracks 14,15, and, in FIG. 1, additionally through a winch device 24 for the displacement of the tensioning roller 22 in two opposite directions along the track 23. This stretching or tensioning device is shown more in detail in FIGS. 4–6 and will be further described in association with these figures at a later stage.

However, the principle of this tensioning device appears best from FIG. 2, wherein the chain-like carriage row 6 is shown in two different extreme positions, the tensioning roller 22 occupying the respective corresponding slackness-accommodating position. Again, attention is directed at the fact that one terminal element 6" of the row of carriages 6 is a fixed point (stationary in relation to the drive aggregates for the cables/hoses), the other terminal element 6''' being a movable point, the so-called towing point, movable according to the double arrows P1 and P2.

Figure 3:
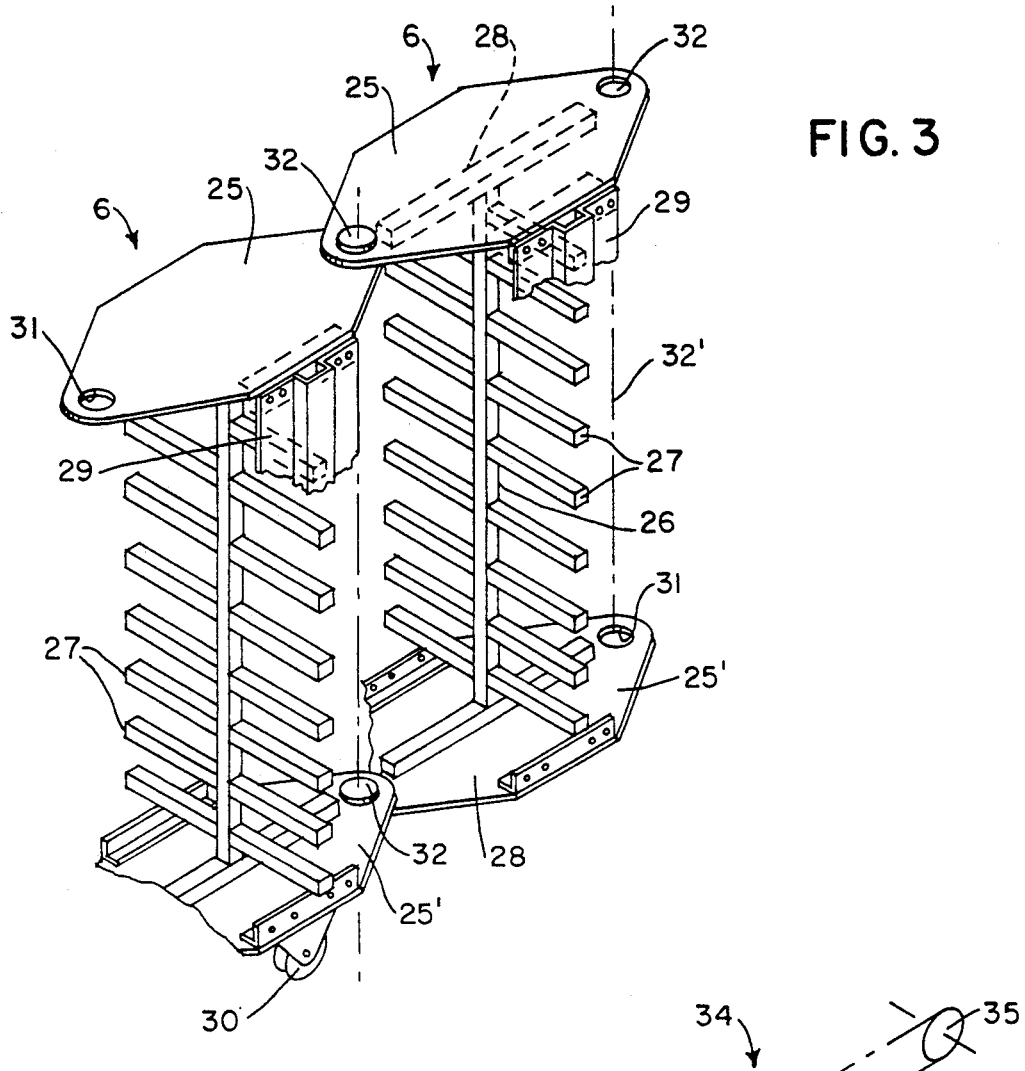
FIG. 3 shows a perspective fragmentary view of two interhinged chain link-like carriage members (inserted/suspended cables/hoses omitted)

As mentioned, the chain-like conveyor carriage device 6 is built up from a number of interhinged chain link-like carriage members, illustrated in detail in FIG. 3, representing a perspective fragmentary view wherein, for the sake of clarity, certain parts have been omitted and partial portions cut away, respectively.

Thus, FIG. 3 shows two interhinged carriage members 6' in perspective. All carriage members, except the terminal carriage elements 6" and 6''', are in principle similar in shape, leaving out of account the fact that, in the embodiment shown, the carriage member height is merely adapted to the hinging in such a way that every other carriage 6' has a height that corresponds to the height of the intermediate carriages plus the thickness of a top plate and a bottom plate 25 and 25', respectively. The top and bottom plates 25,25' of each carriage member 6' are kept mutually spaced by means of a vertical connecting beam 26.

To the connecting beam 26 is mounted a number of horizontal support arms 27 projecting in two opposite directions, for the suspension of cables (high voltage and low voltage cables) and hoses (high pressure and low pressure hoses), not shown. The support arms 27 may have the form of square pipes weldable to the connecting beam 27, the number thereof being determined on the basis of how many hoses and cables the carriage members are to accommodate. The cable/hose-accommodating capacity of the carriage members 6' may be increased through an increase of the carriage height.

At the top and bottom plates 25 and 25' of the carriage members 6', a square pipe-shaped reinforcing beam 28 has been attached and to which the connecting beam 26 is mounted. Only partially shown, easily attachable and detachable lateral profiles 29 serve the task of keeping the hoses/cables in place within the carriage members 6'. These lateral profiles 29 may have the form of so-called cap profiles, likewise functioning as bracing elements for the carriage members 6'.

The lower portions of every other carriage are provided with travelling wheels 30 (only one is visible in FIG. 3). Instead of travelling wheels 30, other friction-reducing means, such as skid-like slide means, might have been used.

For the purpose of being interhinged, each of the top and bottom plates 25,25' of the carriage members 6' are formed with two bearing holes in the form of a bore 31 at each of the opposite ends thereof.

Within each of two, in pairs corresponding, bearing holes 31 of adjacent carriage members 6', a hinge bolt 32 is supported, the axis thereof forming one of the pivot axes 32' of the carriage members 6'. According to the present invention, the pivot axes 32' of the carriage members 6' extend perpendicular to or substantially perpendicular to the plane or planes wherein the movable terminal element, the towing element 6''', of the chain-like row of carriages 6 is to be displaceable to and fro in two directions P1 and P2 intersecting each other. The orientation of the pivot axes 32' of the row of carriages in relation to said displacement directions P1, P2 contributes substantially to the achievement of an arrangement drastically simplified as compared with present technique, for the controlled protected cable/hose-displacement for the general purpose in question.

Thus, the linear displacement movements of the skid base 3 in the opposite directions of the double arrow P1 cause a movement of the chain-like conveyor device 6 in positive/negative X-direction, the linear displacement movements of the derrick 5 in the opposite directions of the double arrow P2 causing a movement of the conveyor carriage device 6 in positive/negative Y-direction (confer the guiding track 16) as well as a corresponding movement in positive/negative X-direction. Any displacement of the skid base/derrick involves an amended course of conveyance. In order to, at all times, to accommodate slackness and, thus, keep the chain-like conveyor carriage device 6 tensioned, the latter —in addition to guide/guiding systems 14-16/11,11'—has been assigned an appropriate tensioning device which, in a practical embodiment, may comprise a winch/wire-assembly for operating the tensioning roller 22.

Figure 4:
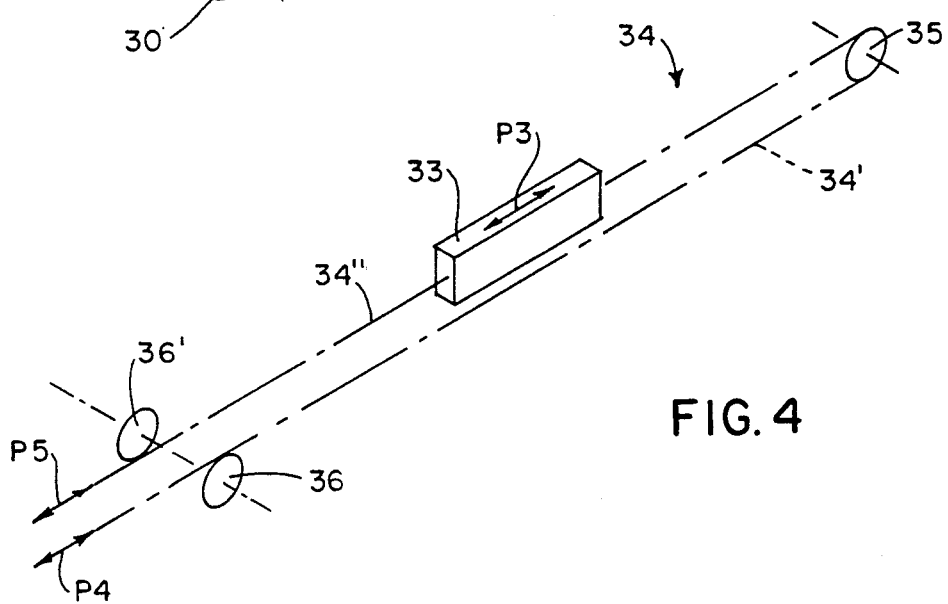
FIG. 4 shows a diagrammatic perspective view of the stretching device serving the purpose of taking-up slackness and stretching the "link chain" forming the conveyor carriage device at all times.

Now, reference is made to FIGS. 4-6 wherein the tensioning device of the conveyor carriage device is further illustrated. As previously mentioned, the purpose of this slackness-accommodating tensioning device is to keep the row of carriages 6 permanently tensioned, so that it is brought to follow the predetermined path 14, 15 at all times.

In FIG. 4, the principle of the tensioning device is illustrated in a highly schematized form. A carriage for the tensioning roller 22 of FIGS. 1 and 2 is denoted by the reference numeral 33, the same being movable to and fro according to the double arrow P3 along the track 23, FIG. 2. The movement of the carriage 33 is e.g. effected by means of the winch 24 in FIG. 1; 34 denoting a winch-operated operating wire having a tensioning wire portion 34' and a slackening wire part 34''. The carriage 33 of the tensioning roller 22 is connected with the slackening wire part 34'' in a way not illustrated in FIG. 4. On the contrary, the way of connecting is shown in FIGS. 5 and 6; one shall return to this matter at a later stage. For the winch-operated operating wire 34, one reversing disc 35 and two guide discs 36,36' have been provided. The double arrows P4 and P5 indicate the movement directions of the wire parts 34',34''.

In accordance with FIG. 5, the tensioning roller 22 is freely rotatively supported in a pedestal 37 adapted to be mounted onto the carriage 33 of the tensioning device. As previously mentioned, this carriage 33 is intended to move within the track 23, as appearing from FIGS. 1, 2 and, partly, from FIG. 7 also.

The tensioning carriage 33 is constructed from H- and channel profiles screwed together, and of which two H-profiles form the base for the pedestal 37 of the tensioning roller 22.

At one end of the carriage 33 of the tensioning roller 22, a cover plate 38 is mounted, said plate being adapted and adjusted to the aperture of the double guiding track 14, 15, and has for its object to cover the track 23 of the carriage 33, thereby preventing the wheels 30, FIG. 3, or similar friction-reducing rolling or sliding means, of the conveyor carriage device, from getting stuck within the track 23 for the tensioning carriage 33.

At each end, the tensioning carriage 33 is provided with a fastener 39,39' for the attachment of the operating wire 34. The design of such a wire fastener 39 appears from the fragmentary view in FIG. 6, wherein the anchoring means itself consists of a bolt 40 mounted to a bifurcated carrier 41 carrying guide wheels 42 preventing twisting of the tensioning carriage 33 within the carriage path track 23.

Further, the carriage structure 33 comprises four pairs of wheels on wheel carriers 43 and 44, the positioning of which being indicated through dot-dash lines in the exploded view of FIG. 5, wherein reference numerals for the wheels themselves are omitted. These wheels are positioned such that the tensioning carriage does not slope when a drag force according to the arrow P4 is established in the tensioning wire part 34' of the operating wire 34.

In order to prevent the tensioning carriage 33 from capsizing, it may be assigned further wheels running on the double rolling or guiding track 14, 15.

The winch 24 is of the kind operating two wire parts 34', 34'', so that the tensioning device 22,33 may be drawn in two opposite directions.

The adaption and positioning of cables/hoses within the conveyor carriage device 6, would have appeared from the foregoing. It should only be added that the individual lengths of the cables/hoses must be adjusted to the length of the carriage row 6, simultaneously as one considers the bending in the area of the rotating guide rollers 11,11' where the row of carriages 6 is deflected.

The cable and hose ends (the power take-off ends) are to be extended onto the coupling box (via 6''') of the derrick 5, preferably without any joints on the cables. On the other hand, the hoses are —after leaving the carriage train 6 at the anchor or towing point 6''',7'—to be coupled to the pipe system of the derrick.

Again, reference is made to FIG. 1, in accordance with which the pipe lines and cable slots enter the conveyor carriage device 6 at the base 8. At the anchor or fixed point 6'',7, the pipes must be coupled onto the hoses threaded through the carriage train 6, the cables leaving the cable slots and being threaded through the carriage train.

Reference numeral 45 denotes a control console wherefrom the winch 24, and the pressure fluid operated cylinders 21,21' for the lifting/lowering of the lateral limitation gates 17 are operated by an operator who, additionally, possibly may take care of the movement of the derrick 5.

I claim:

1. An arrangement in chain-like conveyor devices (6) for protecting accommodation and controlled guidance of flexible cables/hoses/lines to be extended between a stationary unit, a fixed production platform (1), and one relatively thereto displaceable unit, a derrick (5), displaceable in two directions (P1,P2) intersecting each other at right angles, and wherein said displacements take place in one or two parallel horizontal planes, said chain-like conveyor device (6) substantially comprising interhinged chain link-like single members (6'), and having a first stationary end (6''), the other end (6''') thereof being coupled (at 7') to the displaceable unit (5), so that said other end (6''') is brought to follow the displacement movements of the displaceable unit (5) in said horizontal planes, and wherein the chain-like conveyor device has the form of a carriage train (6), the chain link-like carriage members (6') thereof having pivot axes (32') extending perpendicular to or substantially perpendicular to said horizontal planes, the conveyor device/carriage train (6) for securing a controlled movement in said planes, being assigned external guiding and guide means (14-16 and 11,11'), characterized in that the conveyor device/carriage train (6) is assigned an in per se known tensioning device (22,23,34,24) comprising an actuation means (22) adapted to act laterally on the carriage train (6) for slackness-accommodating tensioning of the carriage train in the various positions thereof, and that said guiding means (14-16) comprises one or two stationary guiding tracks (14,15) and a displaceable guiding track (16) extending laterally of the previously mentioned track or tracks (14,15), the lateral track (16) being arranged on a laterally facing addition platform or the like (10) on the skid base (3) of a derrick (5), said guide means having the form of a couple of opposing guide means in the form of freely rotating substantially cylindrical rollers (11,11'), the rotation axes thereof extending parallel to the pivot axes (32') for the interhinged carriage members (6') of the carriage train (6), said guide means (11,11') being arranged on said addition platform or the like (10) of the skid base (3).

2. An arrangement as set forth in claim 1, characterized in that said stationary guiding track(s) (14,15) is-/are formed as a double track (14,15) over a portion of the longitudinal extent thereof and as a single track (15) over the remaining longitudinal portion, the two tracks of the double track (14,15) therebetween forming a guiding groove (23) for the actuation means (22) of the tensioning device, preferably in the form of a freely rotating, substantially cylindrical tensioning roller (22), the rotation axis thereof extending parallel to the pivot axes (32') for the single elements (6') of the carriage train (6), and being supported on a carriage (33) displaceable along the guiding groove or track (23), said carriage (33), via wires (34',34''), being adapted to be operated (P4,P5) from a winch (24).

3. An arrangement as set forth in claim 2, characterized in that the carriage (33) of the actuating means/the tensioning roller (22) has a cover plate (38) extending parallel to the plane for the guiding tracks (14-16) of the carriage train (6), and being formed as well as positioned with a view to covering the guiding track or groove (23) for the carriage (33) of the tensioning roller (22) in a certain area adjacent the tensioning roller (22), in order to prevent wheels (30) or similar friction-reducing rolling or sliding means on the chain link-like carriage members (6') from getting stuck within the guiding groove (23) for the tensioning carriage (33).

4. An arrangement as set forth in claim 1 characterized in that the chain link-like carriage members (6') substantially are constructed from top and bottom plates (25,25') interconnected through an elongated connecting element (26) extending mainly parallel to the pivot axes (32') of the carriage members (6'), and carrying in opposite directions extending support arms (27) for the suspension of cables/hoses/lines, as well as extending laterally of the movement direction of the chain-like carriage train (6), each carriage member (6'), externally of the ends of the support arms (27), being assigned lateral limitation elements (29) keeping the cables/hoses in position and, simultaneously, functioning as bracing elements.

5. An arrangement as set forth in claim 4, characterized in that each of said top and bottom plates (25,25') is formed with two bearing holes (31) for the pivotable interconnection of adjacent carriage members (6') by means of pivot bolts (32) through corresponding bearing holes (31) in neighboring members (6'), the axes thereof being aligned in pairs, forming said pivot axes (32') of the carriage members (6').

6. An arrangement as set forth in claim 1, characterized in that the stationary guiding track(s) (14,15) of the chain-like carriage train (6), along at least one longitudinal edge, is assigned lateral limitation elements (17) normally extending above the level of the guiding track(s), in the form of liftable and lowerable gates, so that the top edge thereof, in a lowermost position, may be brought into alignment with the level of the guiding track(s) (15).

* * * * *